(12) United States Patent
Kalish et al.

(10) Patent No.: US 6,304,705 B1
(45) Date of Patent: Oct. 16, 2001

(54) MODE COUPLING BUFFERED OPTICAL FIBER APPARATUS AND METHOD FOR MAKING

(75) Inventors: David Kalish, Roswell; Paul Emilien Neveux, Jr., Loganville; Albert John Ritger; Carl Raymond Taylor, both of Lawrenceville; John Michael Turnipseed, Lilburn, all of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/361,938

(22) Filed: Jul. 27, 1999

(51) Int. Cl.[7] .............................. G02B 6/02; G02B 6/22
(52) U.S. Cl. ........................................ 385/128; 385/122
(58) Field of Search ........................... 385/128, 122–127; 65/420

(56) References Cited

U.S. PATENT DOCUMENTS

| | | | |
|---|---|---|---|
| 4,038,062 | 7/1977 | Presby | 65/2 |
| 4,410,344 | 10/1983 | Iyengar | 65/3.11 |
| 4,629,286 | * 12/1986 | Fuse et al. | 385/128 |
| 4,637,686 | 1/1987 | Iwamoto et al. | 350/96.29 |
| 4,702,016 | 10/1987 | Gartside et al. | 350/96.23 |
| 4,913,859 | 4/1990 | Overton et al. | 264/1.4 |
| 5,000,772 | 3/1991 | Petisce | 65/3.11 |
| 5,117,472 | 5/1992 | Blyler, Jr. et al. | 385/28 |
| 5,147,433 | 9/1992 | Petisce | 65/3.11 |
| 5,613,028 | 3/1997 | Antos et al. | 385/123 |
| 5,838,862 | 11/1998 | Chien | 385/102 |
| 5,867,616 | 2/1999 | Antos et al. | 385/11 |
| 6,108,476 | * 8/2000 | Iimura | 385/128 |

FOREIGN PATENT DOCUMENTS 19810812 9/1999 (DE) .

* cited by examiner

Primary Examiner—Phan T. H. Palmer
(74) Attorney, Agent, or Firm—John M. Harman (57) ABSTRACT

Embodiments of the invention include an optical energy transmission system, method and apparatus having improved mode coupling. According to embodiments of the invention, an optical energy transmission medium such as an optical fiber includes a plurality of particles formed in one or more coating region layers surrounding the cladding region and/or one or more buffer region layers surrounding the coating region for inducing microbending thereof, thus promoting advantageous mode coupling, which improves bandwidth potential by reducing dispersion. The method for manufacturing the inventive optical energy transmission medium includes forming one or more coating region layers and/or one or more buffer region layers containing particles such as fumed silica in such a way that particles are maintained within the optical energy transmission medium and form controlled perturbations along the optical fiber that enhance mode coupling to the extent that bandwidth of the optical fiber is improved.

19 Claims, 5 Drawing Sheets

MODE COUPLING BUFFERED OPTICAL FIBER APPARATUS AND METHOD FOR MAKING

BACKGROUND OF THE INVENTION

1. Field of the Invention

The invention relates to optical fiber and methods of manufacturing optical fiber. More particularly, the invention relates to optical fiber coatings and methods of coating optical fibers.

2. Description of the Related Art

High performance communications systems, i.e., those systems having gigabit transmission speeds, are being made possible by improving the bandwidth of optical fiber. However, achieving those desired transmission speeds in multimode fiber has been hindered by problems such as dispersion. Because multimode optical fibers are capable of propagating more than one mode of optical energy, an inherent problem with dispersion exists. Such dispersion, more specifically known as modal dispersion, is the broadening or spreading of an optical energy output pulse caused by delays resulting from various pulse modes traveling through the optical transmission medium at different speeds. Such dispersion can be managed by mode mixing or mode coupling, i.e., the mixing or scrambling of the various modes in such a way that effectively reduces the difference in travel times of the various pulses modes. The reduction in dispersion improves the bandwidth of the multimode optical fiber.

It has been recognized that certain microbending (i.e., microscopically small deviations in the fiber axis) of multimode fiber often causes advantageous mode coupling or mode mixing. That is, the introduction of perturbations in the multimode cladding modes enhances mode coupling. Conventional approaches to inducing microbending has varied from externally inducing bends in the outer regions of the fiber (see, e.g., U.S. Pat. No. 4,038,062, which is co-owned with this application) to internally applying refractive index perturbations in the optical fiber preforms that subsequently are drawn into optical fibers (see, e.g., U.S. Pat. Nos. 5,867,616 and 5,613,028). Many conventional methods for inducing microbending techniques have had difficulty in controllably introducing perturbations and reliably reproducing the desired microbends. Furthermore, many conventional microbending techniques are undesirable from the standpoint of manufacturing cost and efficiency.

Accordingly, there remains a need for controllably inducing microbends in optical energy transmission medium such as optical fibers to enhance mode coupling therein.

SUMMARY OF THE INVENTION

The invention is embodied in a system for transmitting optical energy including a source of optical energy, an optical energy transmission medium such as an optical fiber and a receiver of optical energy. The optical energy transmission medium includes a plurality of particles such as fumed silica formed therein for inducing microbending of the optical energy transmission medium, thus promoting advantageous mode coupling, which improves bandwidth potential, e.g., by reducing modal dispersion. The particles are incorporated into, e.g., one or more layers of a coating region formed around the optical fiber portion of the optical energy transmission medium and/or one or more layers of a buffer region formed around the coating region, which includes the coloring layer portion of the buffer region.

An alternative embodiment of the invention includes a method of making an optical energy transmission medium. The method includes providing an optical energy transmission medium with a core region, a cladding region, and a one or more coating region layers having a plurality of particles therein, and forming one or more buffer region layers around the coating region. Also, the method includes providing an optical energy transmission medium with the plurality of particles disposed in one or more coating region layers and/or one or more buffer region layers. The particles form controlled perturbations along the optical fiber that enhance mode coupling. The quantity and size of the particles affect the degree of microbending and thus the degree of mode coupling.

Yet another alternative embodiment of the invention includes a medium for transmitting optical energy within an optical communications system. The medium is, e.g., an optical fiber having a glass core and cladding region surrounded by a coating region made of ultraviolet (UV)-cured acrylate or other suitable material and having a plurality of particles such as fumed silica disposed therein. The optical fiber is surrounded by a buffer region. Also, the medium includes a configuration in which the coating region and/or the buffer region has particles disposed therein. The particles form perturbations in the optical fiber in a manner that advantageously enhances mode coupling.

Still another alternative embodiment of the invention includes a method of transmitting optical energy in an optical communications system. The system includes an optical energy source, optical energy receiver and an optical energy transmission such as an optical fiber coupled therebetween. The transmission method includes providing an optical energy transmission medium having a plurality of particles within one or more coating region layers and/or one or more buffer region layers that induces microbending of the optical energy transmission medium and enhances mode coupling therein. The transmission method also includes transmitting optical energy from the source to the receiver through the optical energy transmission medium. The enhanced mode coupling from microbending caused by the particles improves the bandwidth transmission characteristics of the transmission system.

DETAILED DESCRIPTION

In the following description similar components are referred to by the same reference numeral in order to simplify the sequential aspect of the drawings and/or to enhance the understanding of the invention through the description of the drawings.

Although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Conventionally, an optical energy transmission medium such as an optical fiber includes a glass core region surrounded by a glass cladding region having an index of refraction lower than that of the core region and one or more protective coating layers. For a multimode optical fiber, the diameter of the core region is approximately 50 or 62.5 microns ($\mu$m), although other dimensions certainly are possible. Although the diameter of the core region may vary, typically, the total diameter of the cladding region surrounding the core region is approximately 125 $\mu$m. The optical fiber cladding region typically is covered, for protection and strength, with one or more coatings, e.g., a primary coating layer and a secondary coating layer, typically resulting in a total outer diameter of from approximately 250 $\mu$m to 1000 $\mu$m.

The optical fiber typically is formed from a glass preform containing a core rod inside of a cladding rod. The preform generally is suspended vertically and moved into a furnace at a controlled rate. The preform rod softens in the furnace and optical fiber is drawn from the molten end of the preform rod by a capstan located at the base of a draw tower.

One or more coating layers, which typically are made of thermoplastics or liquid applied curable plastic resins, are applied to the fiber immediately after the optical fiber is drawn and prior to contact between the fiber and any other surface. In this manner, one or more liquid-curable plastic resins such as a urethane acrylate is applied to the optical fiber and then cured into a protective coating region, typically by exposure to ultraviolet (UV) radiation. In some operations, a primary or inner coating layer is applied and cured into a primary coating region layer and a secondary or outer coating layer is applied and cured into a secondary coating region layer.

Buffered optical fibers include a buffer region formed around the coating layers. The buffer region includes one or more layers of plastic material such as nylon, polyolefin, poly(vinylidene fluoride) (PVDF) or other fluoropolymer, poly(vinyl chloride) (PVC), or polyester. Typically the buffer region includes an inner buffer layer formed around the outer coating of the optical fiber and an outer buffer layer formed around the inner buffer layer. Typically, an extruder extrudes the buffer layers around the optical fiber.

As discussed previously herein, it has been recognized that microbending a multimode fiber often causes advantageous mode coupling or mode mixing. However, conventional methods of microbending typically involve externally inducing bends via any number of physical configurations, or internally applying refractive index perturbations in the optical fiber preforms rods.

However, embodiments of the invention are based on the realization that the presence of particles within one or more of the coating layers and/or buffer layers surrounding the core and cladding regions of the optical fiber advantageously causes microbending of the optical fiber. For example, particles are present in one or more of the coating region layers, as will be discussed in greater detail hereinbelow. In this manner, the microbending affects the attenuation of optical energy transmitted through the optical fiber. Furthermore, embodiments of the invention are based on the advantageous realization that, in general, the size and amount of particles within the coating region layers and/or buffer region layers affects the attenuation of the optical fiber. Thus, controlling the size and amount of the particles (e.g., by controlling one or more of processing parameters), in turn, controls the attenuation characteristics of the optical fiber manufactured.

By comparison, conventional manufacturing processes and devices generally attempt to reduce if not eliminate the presence of any particulate matter within the various coating layers and buffer regions that subsequently are formed around the core and cladding regions of the optical fiber. The purity of the applied coating layers and buffer regions both protects and strengthens the underlying optical fiber.

Referring now to FIGS. 1–6, a portion of an optical energy transmission medium 10 according to various embodiments of the invention is shown. The optical energy transmission medium 10, e.g., an optical fiber, includes a core region 12, a cladding region 14 surrounding the core region 12, and a coating region 16 surrounding the cladding region 14. Typically, the coating region 16 includes a primary or inner coating layer 17 surrounding the cladding region 14 and a secondary or outer coating layer 18 surrounding the inner coating layer 17. A coated optical fiber typically refers to the core region 12, the cladding region 14 and the coating region 16.

The core region 12 and the cladding region 14 generally are made of glass and typically drawn from a glass preform, as discussed previously herein. The coating region 16 conventionally is formed by applying one or more layers of acrylate or other suitable material and then curing the layers with ultraviolet (UV) radiation.

Buffered optical fibers include a buffer region 22 including one or more buffer layers, e.g., an inner buffer layer 23 formed around the coating region 16 of the optical fiber and an outer buffer layer 24 formed around the inner buffer layer 23. The buffer layers are, e.g., extruded onto the coated optical fiber. Although two buffer layers 23, 24 are shown, it is understood that the buffer region 22 can have any number of buffer layers formed around the optical fiber, depending on the desired degree of protection. As discussed hereinabove, the layers of the buffer region 22 are made from a suitable coating material such as nylon, polyolefin, poly(vinylidene fluoride) (PVDF) or other fluorpolymer, poly(vinyl chloride) (PVC), or polyester.

As shown in FIGS. 1–6, according to embodiments of the invention, a plurality of particles 26 are present within the optical fiber 10. More specifically, the particles 26 generally arc contained, e.g., in the secondary coating layer 18 (FIG. 1), the primary coating layer 17 (FIG. 2) or both coating layers (FIG. 3), i.e., throughout the entire coating region 16. Alternatively, the particles 26 generally are contained, e.g., in the outer buffer layer 24 (FIG. 4), the inner buffer layer 23 (FIG. 5) or both layers (FIG. 6), i.e., throughout the entire buffer region 22. The particles 26, which are made of, e.g., fumed silica or other suitable materials such as kaolin and talc, are added to the buffer material used in forming the buffer region before the buffer material is applied to the optical fibers. The particles have an average size of approximately 10 μm in diameter, although it is possible to use particles having an average diameter within the range from approximately 0.2 μm to approximately 44 μm in diameter. Upon formation of the buffer region(s) around the coated optical fibers, the particles 26 are maintained within the buffer regions 22.

The presence of the particles 26 in the cladding and buffer regions cause microbending in an advantageous manner, as discussed hereinabove. The particles 26 are a physical presence that causes perturbations in the optical fiber 10 that advantageously couple various modes of optical energy pulses transmitted through the optical fiber 10. The coupling reduces dispersion, which works to improve the bandwidth of the optical fiber 10.

Figure 1:
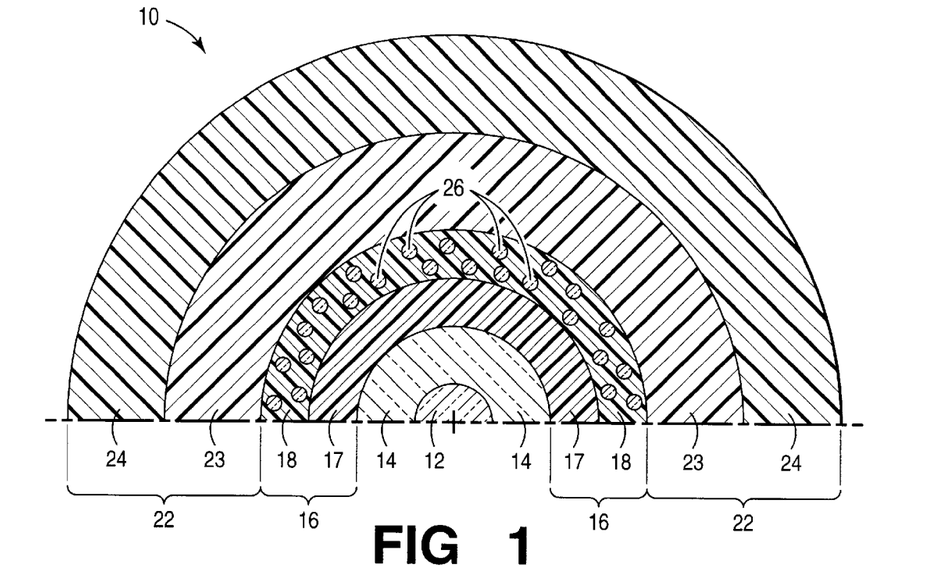
FIG. 1 is a partial cross-sectional view of an optical energy transmission medium according to an embodiment of the invention.
Figure 2:
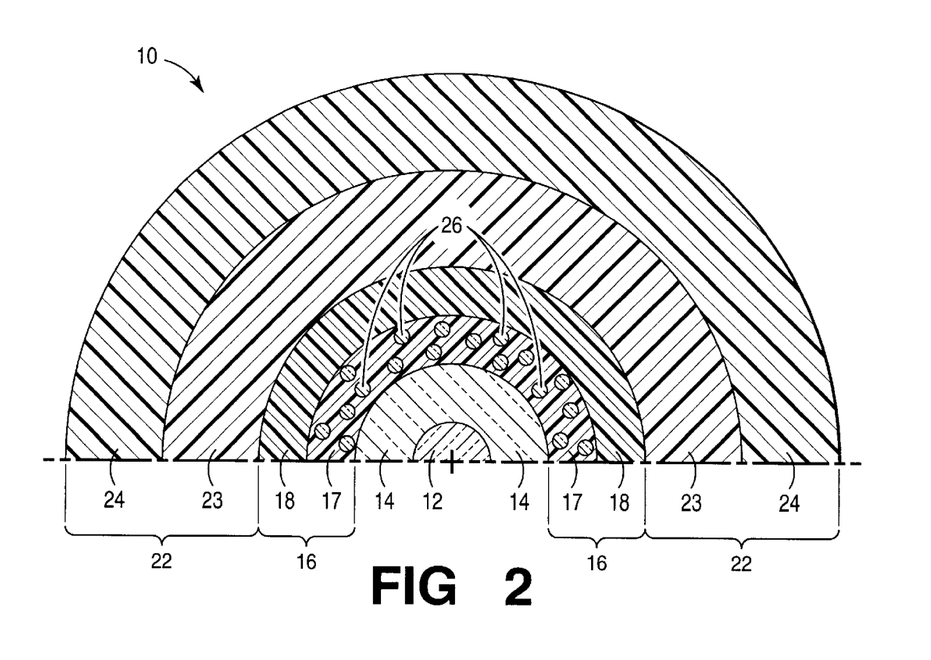
FIG. 2 is a partial cross-sectional view of an optical energy transmission medium according to another embodiment of the invention.
Figure 3:
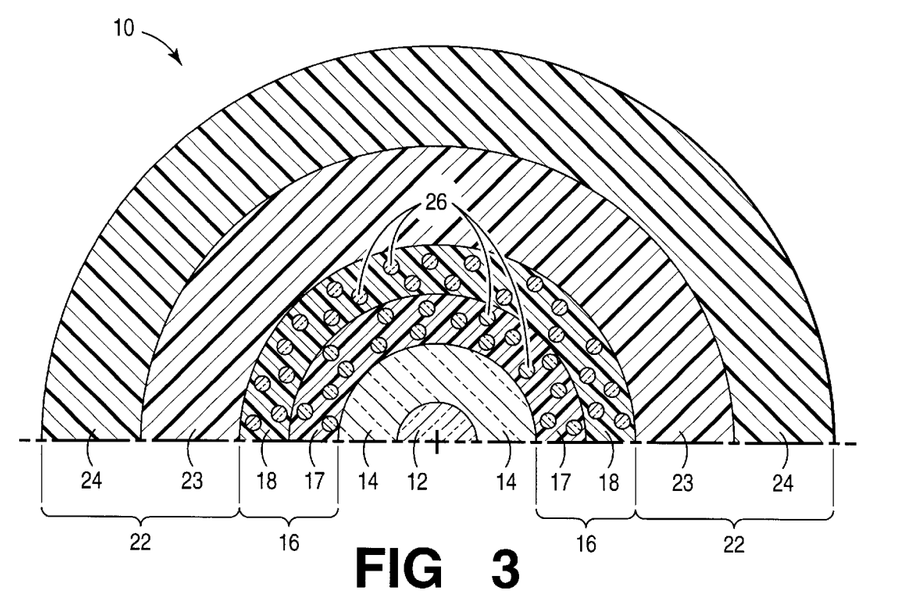
FIG. 3 is a partial cross-sectional view of an optical energy transmission medium according to yet another embodiment of the invention.
Figure 4:
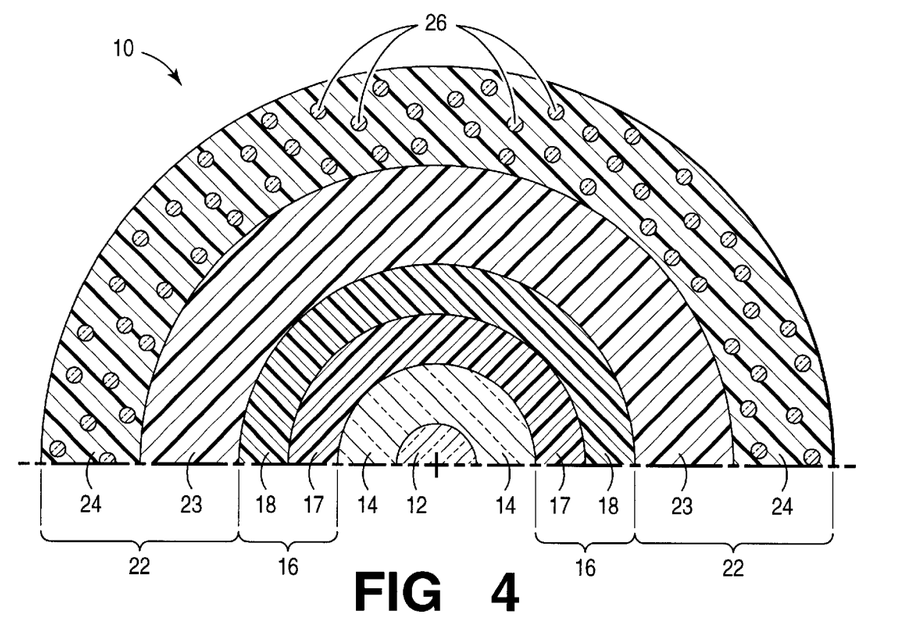
FIG. 4 is a partial cross-sectional view of an optical energy transmission medium according to an alternative embodiment of the invention.
Figure 5:
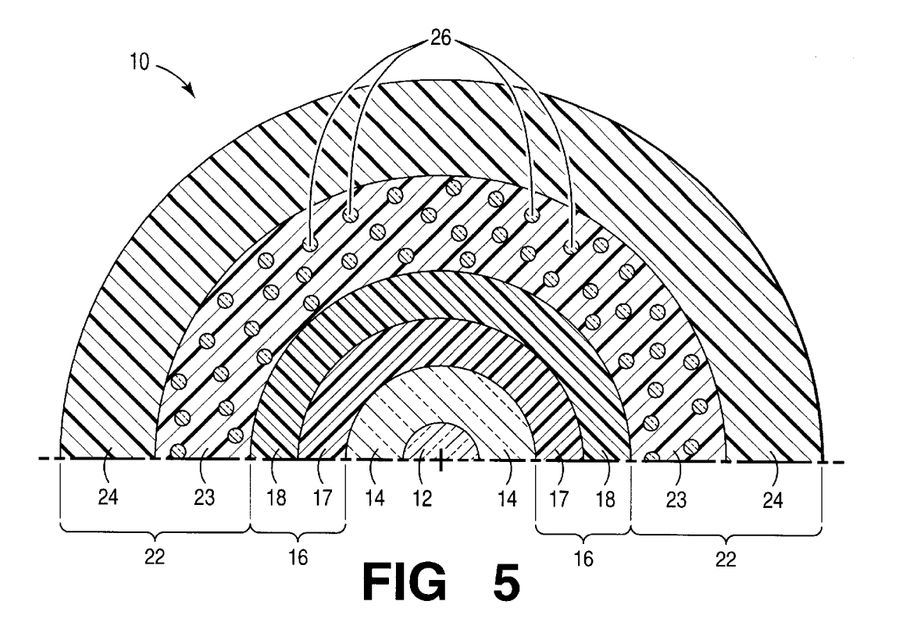
FIG. 5 is a partial cross-sectional view of an optical energy transmission medium according to another alternative embodiment of the invention.
Figure 6:
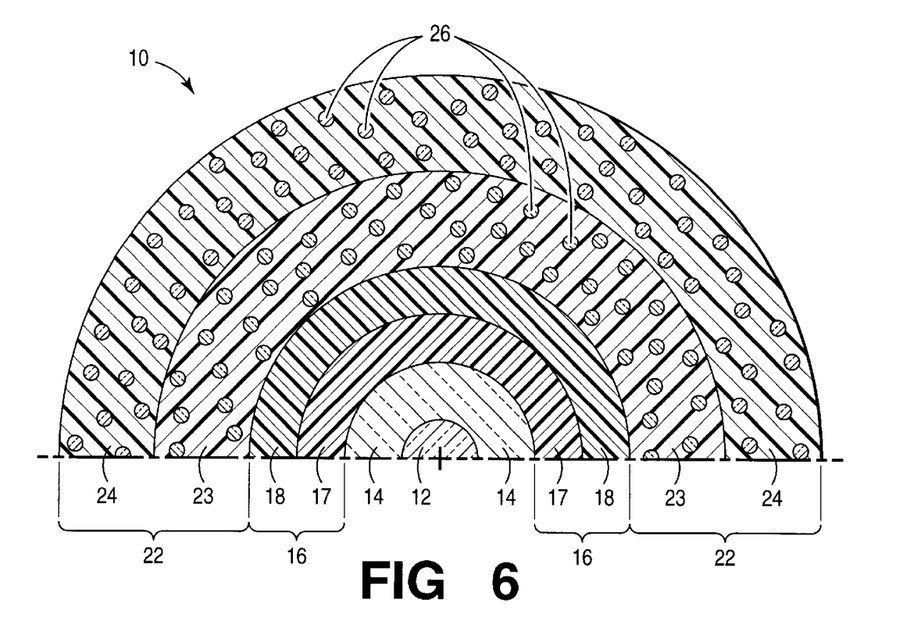
FIG. 6 is a partial cross-sectional view of an optical energy transmission medium according to yet another alternative embodiment of the invention.
Figure 7:
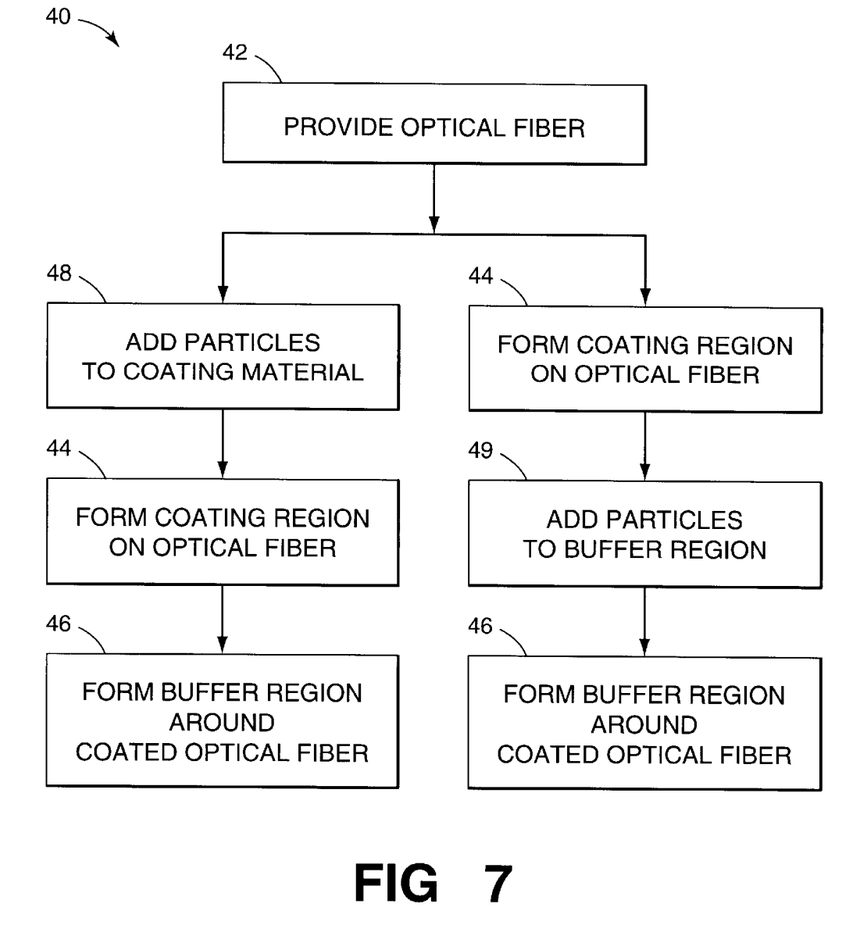
FIG. 7 is a simplified block diagram of an optical buffering line.

Referring now to FIG. 7, with continuing reference to FIGS. 1–6, a method 40 for manufacturing an optical energy transmission medium according to various embodiments of the invention is shown. The method 40 includes a first step 42 of providing an optical energy transmission medium (e.g., an optical fiber) having a core region 12 and a cladding region 14. As discussed previously herein, the core and cladding regions of the optical fiber typically are drawn from a preform as the preform is guided through a furnace. The fiber, which is drawn at a temperature of approximately 1200–1800° C., is cooled subsequently to a temperature below approximately 90° C. before the one or more coating layers of the coating region are applied. Typically, cooling methods include passing the drawn optical fiber through some type of cooling device positioned beneath the furnace. The cooling device uses, e.g., a suitable gaseous and/or liquid coolant.

The next step 44 is to form a coating region 16 over the optical fiber. The coating layers 17, 18 are applied by passing the uncoated optical fiber (i.e., the core and cladding regions) through a coating device or die positioned beneath the furnace and the cooling device. The coating die has a liquid coating reservoir with a replenishable supply of curable coating liquid such as urethane acrylate. The coating device applies the coating liquid to the optical fiber as the optical fiber passes therethrough. The coating die has an exit port positioned downstream of the coating reservoir through which the optical fiber is transported out of the die. The exit port is dimensioned and configured to removes excess coating material from the fiber surface prior to its exit from the coating device.

Once applied, the coating is cured using, e.g., UV radiation, by passing the optical fiber through a curing chamber., having a UV lamp, positioned below the coating device. As the coated optical fiber passes through the curing chamber, the UV radiation emitted from the lamp cures the coating to form the coating region 16, which protects the core and cladding regions. The coating region includes one or more coating layers, which can be formed simultaneously or sequentially.

The next step 46 is to form a buffer region over the coated optical fiber. Once the coated optical fiber has been sufficiently cooled, it is taken up, e.g., in a conventional manner. From there, the coated optical fiber is transported, e.g., to a buffer jacketing line, which forms one or more buffer layers made of, e.g., nylon, polyolefin, poly(vinylidene fluoride) (PVDF) or other fluorpolymer, poly(vinyl chloride) (PVC), or polyester, around the coated optical fiber.

Figure 8:
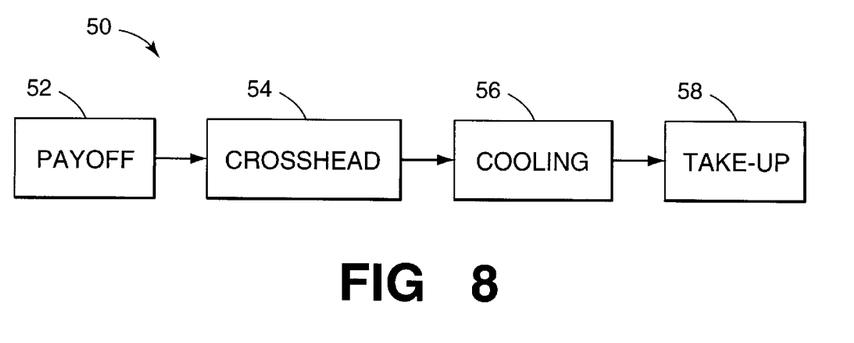
FIG. 8 is a simplified block diagram of a method for manufacturing an optical energy transmission medium according to embodiments of the invention.

Referring now to FIG. 8, with continuing reference to FIGS. 1–6 and 7, a simplified block diagram of an optical fiber buffering line 50 is shown. Initially, the coated optical fiber is payed off from a payoff 52 (also referred to as a payout). The coated optical fiber then is drawn through a crosshead 54, which forms one or more buffer layers around the coated optical fiber. The crosshead 54 contains, e.g., an extruder (not shown) that extrudes the buffer layers, e.g., inner buffer layer 23 and outer buffer layer 24, around the coated optical fiber. Upon passing through the crosshead 54, the now-buffered optical fiber passes through a cooling station 56 to be cooled, e.g., in a conventional manner. Upon being cooled, the buffered optical fiber is drawn through a pulling device at a suitable tension onto a takeup reel 58.

According to embodiments of the invention, the method 40 for manufacturing an optical energy transmission medium includes a step 48 of adding a plurality of particles to the coating material, i.e., the material used to form the coating region 16. As shown, the particles are added to the coating material prior to the step 44 of forming the coating region around the optical fiber. The concentration of particles present in the coating material varies, e.g., from approximately 0.1% to approximately 1.0%. The particles are made of, e.g., fumed silica, kaolin or talc, or other suitable material, and have an average size of, e.g., approximately 0.2 to 44 μm in diameter. Typically, individual particle size is approximately 10 μm in diameter. As the formation step 44 is performed, the particles become trapped within the formed coating region 16.

According to alternative embodiments of the invention, the method 40 for manufacturing an optical energy transmission medium includes a step 49 of adding a plurality of particles to the buffer material, i.e., the material used to form the buffer region 22. The concentration of particles in the buffer material is similar to previously-discussed embodiments, e.g., approximately 0.1% to approximately 1.0%. As shown, the particles are added to the buffer material prior to the step 46 of forming the buffer region 22 around the coated optical fiber. The particles are made of, e.g., fumed silica, kaolin or talc and typically have an average diameter of approximately 10 μm, although particle size ranges, e.g., from approximately 0.2 to 44 μm in diameter. As the buffer region formation step 46 is performed, the particles become trapped within the formed buffer region 22.

As discussed in greater detail hereinabove, the particles 26 present in the coating region and/or the buffer region of the optical fibers shown in FIGS. 1–6 are controllably formed within the optical fiber and advantageously cause a desired degree of microbending of the optical fiber. In this manner, mode coupling is controllable within the fiber in such a way that bandwidth characteristics are improved, e.g., reduced dispersion.

Figure 9:
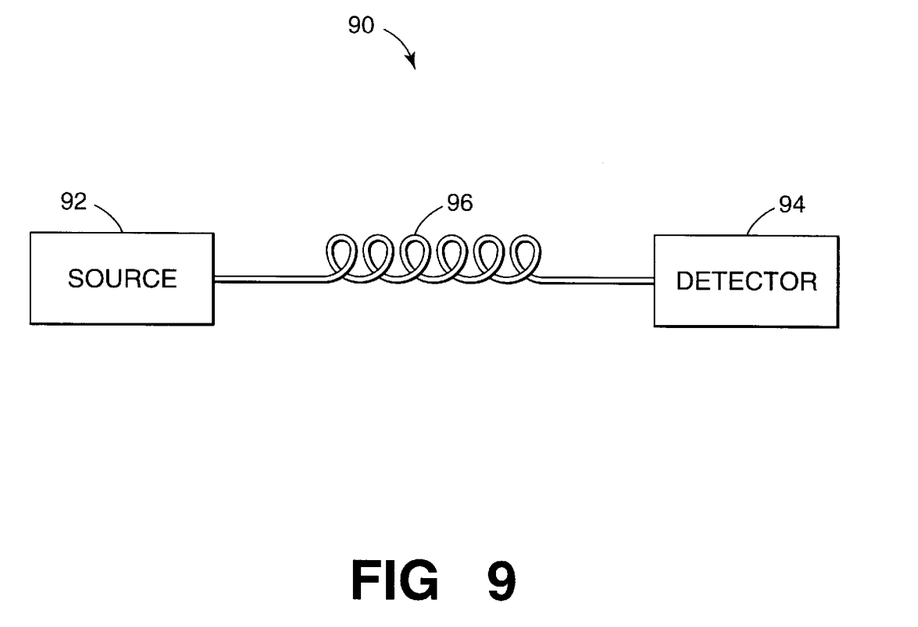
FIG. 9 is a simplified schematic diagram of an optical system in which embodiments of the invention are useful.

Referring now to FIG. 9, shown is a simplified schematic diagram of an optical system 90 in which embodiments of the invention are useful. The optical communications system 90 includes one or more optical sources 92, one or more optical detectors or receivers 94, and an optical energy transmission medium 96 such as one or more optical fibers. According to embodiments of the invention, the optical energy transmission medium 96 includes a plurality of particles such as fumed silica formed therein for inducing microbending of the optical energy transmission medium, thus promoting advantageous mode coupling, which improves bandwidth potential, e.g., by reducing modal dispersion.

It will be apparent to those skilled in the art that many changes and substitutions can be made to the embodiments of the optical fiber systems devices and methods of manufacturing herein described without departing from the spirit and scope of the invention as defined by the appended claims and their full scope of equivalents.

What is claimed is:

1. An optical waveguide system for transmitting optical energy, comprising:
    at least one source of optical energy;
    an optical energy transmission medium coupled to the source for transmitting optical energy from the source, wherein at least a portion of the optical energy transmission medium includes a plurality of particles disposed therein for inducing microbending of the optical energy transmission medium; and
    a receiver coupled to the optical energy transmission medium for receiving optical energy from the source,
    wherein the plurality of particles induces microbending in such a way that mode mixing is effected within the optical energy transmission medium.

2. The system as recited in claim 1, wherein the optical energy transmission medium includes a coating region having at least one coating layer, and wherein the plurality of particles is disposed within at least one of the coating layers.

3. The system as recited in claim 1, wherein the optical energy transmission medium includes a buffer region having at least one buffer layer, and wherein the plurality of particles is disposed within at least one of the buffer layers.

4. The system as recited in claim 1, wherein the optical energy transmission medium includes a core region, a cladding region formed around at least a portion of the core region, a coating region formed around at least a portion of the cladding region, and a buffer region formed around at least a portion of the coating region, wherein the plurality of particles is disposed within at least a portion of the coating region and/or at least a portion of the buffer region.

5. The system as recited in claim 1, wherein the plurality of particles includes a material selected from the group consisting of fumed silica, kaolin and talc.

6. A method of making an optical energy transmission medium, said method comprising the steps of:
    providing an optical energy transmission medium having a core region, a cladding region formed around at least a portion of the core region and a coating region formed around at least a portion of the cladding region; and
    forming a buffer region around at least a portion of the coating region,
    wherein a plurality of particles is disposed within at least a portion of the coating region and/or at least a portion of the buffer region,
    wherein the coating region and/or the buffer region is formed in such a way that the plurality of particles disposed therein induce microbending of the optical energy transmission medium in such a way that mode mixing is effected within the optical energy transmission medium.

7. The method as recited in claim 6, wherein the coating region includes a primary coating layer formed around at least a portion of the cladding region and a secondary coating layer formed around at least a portion of the primary layer, and wherein the plurality of particles is disposed within at least one of the primary and secondary coating layers.

8. The method as recited in claim 6, wherein the buffer region includes an inner buffer layer formed around at least a portion of the coating region and an outer buffer layer formed around at least a portion of the inner buffer layer, and wherein the plurality of particles is disposed within at least one of the inner and outer buffer layers.

9. The method as recited in claim 6, wherein at least a portion of the plurality of particles disposed in the buffer region includes a material selected from the group consisting of fumed silica, kaolin and talc.

10. A medium for transmitting optical energy within an optical communications system, comprising:
    a core region;
    a cladding region formed around at least a portion of the core region;
    a coating region formed around at least a portion of the cladding region;
    a buffer region formed around at least a portion of the coating region; and
    a plurality of particles disposed within at least a portion of the coating region and/or the buffer region for inducing microbending of the optical energy transmission medium in such a way that mode mixing is effected within the optical energy transmission medium.

11. The medium as recited in claim 10, wherein the coating region includes a primary coating layer formed around at least a portion of the cladding region and a secondary coating layer formed around at least a portion of the primary layer, and wherein the plurality of particles is disposed within at least one of the primary and secondary coating layers.

12. The medium as recited in claim 10, wherein the buffer region includes an inner buffer layer formed around at least a portion of the coating region and an outer buffer layer formed around at least a portion of the inner buffer layer, and wherein the plurality of particles is disposed within at least one of the inner and outer buffer layers.

13. The medium as recited in claim 10, wherein at least a portion of the plurality of particles disposed in the buffer region includes a material selected from the group consisting of fumed silica, kaolin and talc.

14. The medium as recited in claim 10, wherein at least a portion of the buffer region is selected from the group consisting of nylon, polyolefin, poly(vinylidene fluoride) (PVDF) or other fluorpolymer, poly(vinyl chloride) (PVC), or polyester.

15. A method of transmitting optical energy in an optical communications system including a source of optical energy, at least one receiver for receiving optical energy and an optical energy transmission medium operably coupled to the source and the receiver for transmitting optical energy therebetween, said method comprising the steps of:
    providing an optical energy transmission medium having a plurality of particles disposed therein for inducing microbending of the optical energy transmission medium; and
    transmitting optical energy from the source to the receiver through the optical energy transmission medium, wherein the microbending in the optical energy transmission medium causes mode-mixing of the transmitted optical energy.

16. The method as recited in claim 15, wherein the optical energy transmission medium includes a coating region having at least one coating layer, and wherein the plurality of particles is disposed within at least one of the coating layers.

17. The method as recited in claim 15, wherein the optical energy transmission medium includes a buffer region having at least one buffer layer, and wherein the plurality of particles is disposed within at least one of the buffer layers.

18. The method as recited in claim 15, wherein the optical energy transmission medium includes a core region, a cladding region formed around at least a portion of the core region, a coating region formed around at least a portion of the cladding region, and a buffer region formed around at least a portion of the coating region, wherein the plurality of particles is disposed within at least a portion of the coating region and/or at least a portion of the buffer region.

19. The method as recited in claim 15, wherein the plurality of particles includes a material selected from the group consisting of fumed silica, kaolin and talc.

* * * * *